United States Patent [19]

King

[11] Patent Number: 4,580,637
[45] Date of Patent: Apr. 8, 1986

[54] HORSESHOES

[76] Inventor: Stephen J. King, "Brundall", Hale House La., Churt, Farnham, Surrey, United Kingdom

[21] Appl. No.: 642,391

[22] Filed: Aug. 20, 1984

[51] Int. Cl.$^4$ .......................... A01L 1/04; A01L 5/00
[52] U.S. Cl. .................................. 168/7; 168/DIG. 1
[58] Field of Search ...................... 168/4, 6, 7, DIG. 1

[56] References Cited

U.S. PATENT DOCUMENTS

| | | | |
|---|---|---|---|
| 374,727 | 12/1887 | Bingham | 168/7 |
| 382,131 | 5/1888 | Bingham et al. | 168/7 |
| 427,976 | 5/1890 | Curtin | 168/7 |
| 726,643 | 4/1903 | Colleran | 168/DIG. 1 |
| 2,024,265 | 12/1935 | Anderson et al. | 168/4 |
| 4,206,811 | 6/1980 | Dallmer | 168/4 |

FOREIGN PATENT DOCUMENTS

| | | |
|---|---|---|
| 290535 | 5/1928 | United Kingdom . |
| 339163 | 12/1930 | United Kingdom . |
| 1239202 | 7/1971 | United Kingdom . |
| 1269721 | 4/1972 | United Kingdom . |
| 1512983 | 6/1978 | United Kingdom . |
| 2101463 | 1/1983 | United Kingdom ..................... 168/4 |

Primary Examiner—Robert P. Swiatek
Attorney, Agent, or Firm—Ronald B. Sherer

[57] ABSTRACT

This horseshoe has segment 1A joining segments 1B, 1C which have first portions 2B, 2C for connection with segment 1A and second portions 3B, 3C which, in use, overlie a heel region. When assembled segments 1B, 1C are secured fast to segment 1A. Second portions 3B, 3C are formed to cover a range of different feet and adapted to be shaped to the foot to which the shoe is fitted. Segment 1A to 1C are formed from plastics material injection moulded onto steel inserts 4A, 4B, 4C. The inserts 4B, 4C within the second portions 3B, 3C are so contoured as to permit the shaping of the plastics material.

6 Claims, 3 Drawing Figures

HORSESHOES

BACKGROUND TO THE INVENTION

This invention relates to improvements in or relating to horseshoes. In a prior patent application No. 2101463A, to which reference is directed, the present applicant discloses a horseshoe comprising a toe portion and two heel segments separate and distinct from the toe portion but secured fast thereto. The specification is addressed to the provision of a horseshoe formed from plastics material as an alternative to the traditional steel shoe which for fitting requires the services of a blacksmith to shape the shoe and has the additional disadvantages set out in that specification. In the embodiments of UK specification No. 2101463A the horseshoe comprises five segments, two of which differ from the remainder in not being adapted for nailing. These two segments are arranged in use, to cover that region of the heel of a horses foot to which the shoe is affixed without being nailed thereto. Nailing of a horseshoe in this region of the foot is to be avoided since in this region the dead horny wall of the foot is particularly weak and thin so that nails here greatly increase the risk of lameness, both due to the possibility of the wall splitting and also nails inadvertently entering the sensitive laminea. This prior shoe, when assembled from a plurality of segment is nailed to the horses foot and the segments are secured fast to one another in order that the composite shoe is relatively rigid and in this way each nail is supported by all others as in the steel shoe. A particular feature of this known shoe is that from a small range of individual segments a very large range of shoes can be formed to suit almost all horses.

It is an object of the present invention to provide a further improvement by means of which the number of segments forming the stock from which segments are selected to form a horseshoe for a particular horse can be greatly reduced whilst still maintaining the advantages of the earlier proposal.

It is a further object of the present invention to provide, in the preferred embodiments, a construction of segment which exhibits still further advantages in performance.

SUMMARY OF THE INVENTION

According to one aspect of the present invention there is provided a horseshoe comprising a series of three segments formed of plastics material, one said segment joining the other two segments, said other two segments having a first portion for connection to said one segment and a second portion which, in use, overlies a heel region, said other two segments being secured fast to said one segment, wherein the second portions of each of said other two segments is formed to cover a range of different feet and adapted to be shaped to the foot to which the shoe is fitted.

It is found that it is in the heel region of horses feet that the greatest variations occur. The horseshoe according to the present invention by providing the second portions formed to cover a range of different feet and adapted to be shaped to the foot to which the shoe is fitted, enables horses to be shod from a greatly reduced stock of parts. The disadvantages attributed in the earlier specification of a large segment in the heel region is thereby avoided.

In one method of assembling this horseshoe, three segments are selected and arranged to match the shape of the foot being shod. The three segments are then secured fast; i.e., rigidly secured together. Then, the second portions are shaped to the contour of the heel region of the foot. Shaping can be effected by cutting the plastics material to the requisite shape. Finally the horseshoe thus formed is attached to the foot. When the shoe is nailed, the nails are applied through the one segment and the first portions of the two other segments. Such a horseshoe has the advantages of a steel horseshoe in so far as the rigidity of the shoe ensures that any local load is transmitted to all nails and security of fixing is maintained. At the same time, the horseshoe has the advantage that the second portions, which permit fitting to a range of different feet, do not rely on nails for their security. It further has the advantages of the plastic shoe relative to a metal shoe as regards the disadvantages of the metal shoe in terms of requiring the services of a blacksmith, the high weight, poor grip on metalled surfaces, the high rate of wear of the metal shoe and the high transmission of percussive forces.

In a preferred embodiment the one segment extends over an arcuate leading toe portion of the shoe and the said two other segments each extend along a respective side portion and heel region of the shoe.

In the preferred embodiments said one segment is formed by a metallic insert covered with said plastics material, and said two other segments are each formed by a metallic insert covered with said plastics material, the metallic inserts within the second portions being so contoured as to permit said shaping of said plastics materials. For the nailing of the horseshoe to a horses foot, it is preferred to provide said one segment and the first portions of the two other segments with apertures to receive nails which apertures are in register in the metallic inserts and the plastics material.

It will be appreciated that said one segment and the first portions of said two other segments each has substantially the same radius and length as the corresponding part of the foot it will cover. Also they will be of substantially uniform width. The second portions, being formed to cover a range of different feet in the heel region where variation is greatest, need to extend in their unshaped condition (i.e. prior to shaping) over a greater area. In an embodiment this second portion has a configuration such that the width of this portion increases along its length in the direction from the first portion to a free end of the second portion. In the preferred embodiment, as viewed in plan, the curvature of the outer periphery is substantially regular whereas the curvature of the inner periphery is substantially regular over the one segment and the first portions of the two other segments and diverges inwardly over the second portions of the two other segments.

In a preferred embodiment the ends of said one segment and respective ends of said first portions are adapted for initial temporary fixing in the desired foot configuration, and means is provided to secure these segments fast once said temporary fixing has been accomplished. In practice temporary fixing is accomplished with the shoe parts in contact with the horses foot, and then the parts are made fast off the foot. Likewise, the requisite configuration for the second portions is established with the shoe in contact with the foot, but the cutting is effected with the shoe off the foot.

According to a further aspect of the present invention there is provided a kit of parts for making a horseshoe in accordance with the present invention.

There is also provided a method of shoeing a horse which comprises the steps of:
(a) selecting from a kit of parts in accordance with the present invention a combination of said one segment and said two other segments suitable to cover the configuration of the foot,
(b) securing fast said one segment with said two other segments,
(c) shaping the second portions of said two other segments to the configuration of the foot,
(d) securing the shoe so formed to the foot.

BRIEF DESCRIPTION OF THE DRAWINGS

An embodiment of the invention will now be described, by way of example only, with reference to the accompanying drawing, in which.

DETAILED DESCRIPTION OF THE EMBODIMENTS

Figure 1:
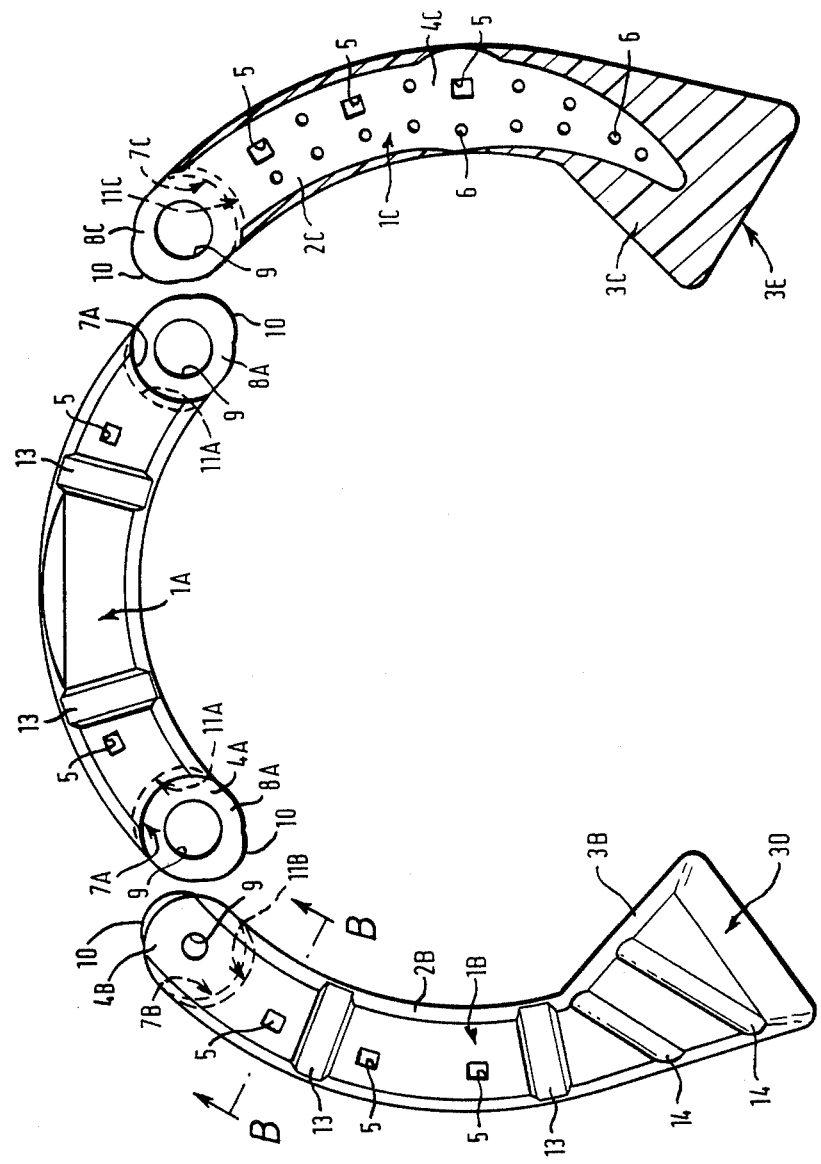
FIG. 1 shows in plan view, with the parts separate, a horseshoe according to an embodiment of the invention.

In the drawing there is shown a horseshoe comprising a series of three segments 1A, 1B, 1C, one segment 1A being arranged to join the other two segments 1B, 1C. The other two segments 1B, 1C are similar and of opposite hand. Segment 2C is shown in section in order to illustrate the contour of an insert 4C. Each has a first portion 2B, 2C for connection to segment 1A and a second portion 3B, 3C which in use, overlies a heel region. With the shoe assembled, the two segments 1B, 1C are secured fast to the segment 1A. The second portion 3B, 3C of each of segments 1B, 1C is formed to cover a range of different feet and adapted to be shaped to the foot to which the shoe is fitted.

Segment 1A is formed by a metallic insert 4A covered with plastics material, and the other segments 1B, 1C are each formed by a metallic insert 4B, 4C covered with plastics material.

The metallic inserts 4B, 4C within the second portions 3B, 3C are so contoured as to permit the shaping of the plastics material. FIG. 1 shows insert 4C, and it will be appreciated that insert 4B is similar. Inserts 4B, 4C project into second portions 3B, 3C but terminate short of the ends 3D, 3E. Their width reduces in the direction towards ends 3D, 3E, as shown. Apertures 6 permit bonding of the plastics material to the inserts 4B, 4C.

Figure 2:
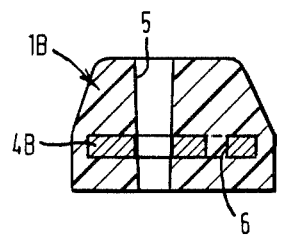
FIG. 2 shows a sectional view taken on the line B-B of FIG. 1.

As can be seen from FIGS. 1 and 2, the segment 1A and the first portions 2B, 2C of said other segments 1B, 1C are provided with apertures 5 to receive nails not shown. The apertures 5 are in register in the metallic inserts 4A to 4C and the plastics material of segments 1A to 1C.

As is clearly apparent from FIG. 1, the second portions 3B, 3C have a configuration such that the width of each second portion 3B, 3C increases along its length in a direction from the first portion 2B, 2C to a free end 3D, 3E respectively. In this embodiment as viewed in plan view of FIG. 1 the curvature of the outer periphery is substantially regular whereas the curvature of the inner periphery is substantially regular over the one segment 1A and the first portions 2B, 2C of the two other segments 1B, 1C and diverges inwardly over the second portions 3B, 3C of the two other segments 1B, 1C.

Figure 3:
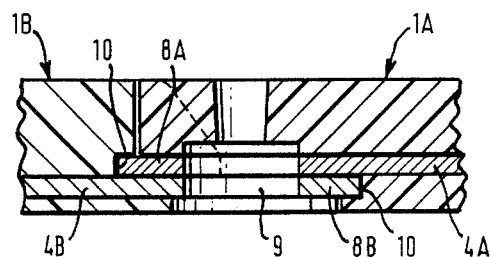
FIG. 3 shows, in section, a joint between components of FIG. 1.

It will be seen that in this embodiment the segment 1A extends over an arcuate leading toe portion of the shoe and that the segments 1B, 1C extend along respective side portions at 2B, 2C and the heel region of the shoe at 3B, 3C. It can be seen that segment 1A and portions 2B, 2C have substantially uniform width. Reference to FIG. 2 indicates the cross-sectional structure of portion 2B of segment 1B. Thus, the insert 4B which extends from the joint with segment 1A through portion 2B and into portion 3B, is located at a level such that at the end for connection with the segment 1A the metallic insert is exposed. Looking at FIG. 3 it will be seen that segment 1B has recessed end 7B to recieve the respective recessed end 7A of the segment 1A. Likewise, the segment 1C is similarly formed. It will be seen from FIG. 1 that the inserts 4A, 4B, 4C have end portions 8A, 8B, 8C which are apertured at 9 for connection by suitable means (not shown) to form joints. These portions 8A, 8B, 8C have protruberances 10 which engage in respective arcuate recesses 11A, 11B, 11C and assist in the alignment of the segments 1A, 1B, 1C. The segment 1A, intermediate its ends, has a cross-section similar to that shown in FIG. 2, except that the metallic insert 4A thereof is at a level to lie in contact, at the joints with segments 1B, 1C, on the metallic insert 4B. As indicated in FIG. 1 the recessed ends 7A, 7B, 7C, seen in plan, are of circular configuration; recessed ends 7B and 7C lie in the upper part of segments 1B, 1C as seen in side view (e.g. FIG. 2), and the recessed end 7A at each end of segment 1A lies in the lower part thereof, whereby the respective recessed ends 7A and 7B, 7A and 7C overlap and are complementary. Once these joints have been made fast, for example by expanding a splined pin therethrough, the horseshoe presents a continuous contour at the joints. Prior to the joints being made fast, the segments 1B, 1C may be manipulated relative to the segment 1A to the required configuration. The recessed end pairs 7A and 7B, 7A and 7C may be adapted for initial temporary fixing in a desired foot configuration.

It will be noted from FIG. 2 that the side walls of the segment 1B (1A, 1C or similar in this respect) are inclined towards one another from above the level of insert 4B. It will be seen from FIG. 1 that the segments 1A to 1C are provided with recesses 13 and that second portions 3B, 3C have recesses 14 formed in the plastics material.

Plastics materials from which the segments may be formed, for example by injection moulding around a steel insert, include polyurethane, ultra high molecular weight polyethelene and super tough nylon. The polyurethane may include abrasive particles, for example aluminium oxide zirconia eutectic to enhance wear resistance, but fillers may also be used in other polymers such as polyvinyl chloride and polyamides. The metallic inserts 4A to 4C may be made of steel.

In use a horse is shod by selecting that series of segments 1A and two other segments 1B, 1C from a stock of such components of different sizes, the selected series being suitable to cover the configuration of the foot. These parts are placed in contact with the foot and their relative positions adjusted to the foot. Then the segment 1A is secured fast at either end with the segments 1B, 1C. Next the second portions 3B, 3C of the two other segments 1B, 1C are shaped to the configuration of the foot. The portions 3B, 3C can be cut with a knife, for this the shoe is removed from the foot. Finally, the horseshoe is secured to the foot by nailing in the segment 1A, and portions 2B, 2C.

What is claimed is:

1. A horseshoe comprising a series of three segments each formed by a metal insert covered with plastics material, one said segment joining the other two segments, said other two segments having a first portion for connection to said one segment and a second portion which, in use, overlies a heel region, means for rigidly securing said other two segments to said one segment, the second portion of each of said other two segments terminating in an enlarged plastic portion having a shape and configuration capable of covering a range of different feet whereby said enlarged terminal portions are custom-shaped by having said enlarged portions reduced to the size of the foot to which the shoe is fitted, said metallic inserts within said second portions being shaped with progressively narrowing terminal portions within said terminating enlarged plastic portions to permit said shaping of only said plastics material.

2. A horseshoe as defined in claim 1, wherein said one segment and the first portions of said other segments are provided with apertures to receive nails, which apertures are in register in the metallic inserts and the plastics material.

3. A horseshoe as defined in claim 1, wherein said second portions have a configuration such that the width of each second portion increases along its length in a direction from the first portion to a free end of the second portion.

4. A horseshoe as defined in claim 3, wherein as viewed in plan the curvature of the outer periphery is substantially regular whereas the curvature of the inner periphery is substantially regular over the one segment and the first portions of the two other segments and diverges inwardly over the second portions of the two other segments.

5. A method of shoeing a horse comprising the steps of:
   (a) providing a plurality of first segments having a plurality of sizes and a plurality of second segments, said segments being formed from plastics material, each of said first segments being shaped for joining with two of said second segments, each of said second segments having a first portion for connection to a first segment and a second portion which, in use, overlies a heel region and is enlarged such as to have a shape and configuration capable of covering a range of different feet and adapted to be shaped by having its enlarged portion reduced to the size of the foot to which the shoe is fitted,
   (b) selecting from said plurality of first and second segments a combination of a said first segment and two of said enlarged second segments suitable to cover the configuration of the foot,
   (c) rigidly securing said first segment with said second segments,
   (d) shaping by reducing the size of the enlarged second portions of said second segments to the configuration of the foot, and
   (e) securing the shoe so formed to the foot.

6. The method as defined in claim 5, wherein between steps (b) and (c), the ends of said first segment and said first portions of said second segments are initially and temporarily fixed in the desired foot configuration, and thereafter, said first and second segments are rigidly secured together as recited in step (c).

* * * * *